Patented July 29, 1952

2,605,462

UNITED STATES PATENT OFFICE 2,605,462

PLAN POSITION INDICATOR SYSTEM

William O. Reed, East Walpole, and Leland J. Haworth, Belmont, Mass., assignors, by mesne assignments, to the United States of America as represented by the Secretary of the Navy Application October 30, 1945, Serial No. 625,662

5 Claims. (Cl. 343—11)

This invention relates to radio pulse echo systems, and more particularly to plan position indicator systems having fixed deflection coils.

The primary object of the invention is to generally improve systems of the specified character.

In a conventional fixed coil system the output of the sweep wave or sawtooth wave generator is modulated in accordance with sine and cosine envelopes, as by means of a rotary transformer turned in unison with the antenna. In going through a transformer there can be no direct current component, and the zero line corresponds to the average line of the wave. The positive part of the wave, that is, the portion appearing above the zero line, is the only effective or useable part. The negative part is the recovery excursion of the beam. One object of the present invention is to reduce or eliminate the negative excursion of the beam and to clamp the sweep wave at zero, so that each cycle will start from zero.

The point where the secondary current passes through zero is sometimes called the pivot point. This should remain stationary, but analysis shows that if the sweep speed is changed, or if the duty cycle is changed, the location of the pivot point in the cycle will also change. This is undesirable because it complicates the problem of synchronizing the range trace on the screen with the range from which echoes are being received at any instant. Another disadvantage is that a duty cycle of greater than 50% would not be possible without modification of the wave form.

Some objects of the present invention are to overcome the foregoing difficulties; to provide a sweep wave which starts at zero for each sweep, and to provide a sweep wave in which the pivot point does not shift.

To accomplish the foregoing general objects, and other more particular objects which will hereafter appear, the present invention resides in the method and circuit elements and their relation one to the other, as will hereafter appear in the following specification. The specification is accompanied by drawings in which.

Figure 1:
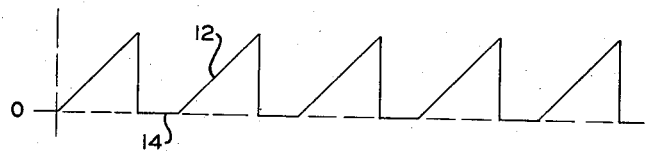
Fig. 1 shows the sweep wave or sawtooth current supplied to the primary of a transformer.
Figure 2:
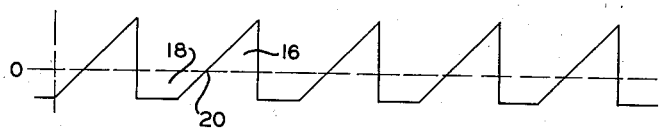
Fig. 2 shows the secondary current delivered by the transformer.

Referring to the drawings, and more particularly to Fig. 1, the sweep wave or sawtooth current supplied to the primary of a transformer may be wholly positive, that is, the rise of current shown at 12 begins from the zero axis 14. In going through a transformer (or condenser or any device not having a conductive connection) the wave is lowered to provide an average at the zero axis. Thus the area 16 (Fig. 2) above the zero axis must equal the area 18 below the zero axis, and the effective or useful part of the sweep begins at the point 20. If the sweep speed is changed, or if the duty cycle is changed, the location of the pivot point 20 will change, which is itself undesirable because it complicates the problem of properly synchronizing the range trace on the screen.

Figure 3:
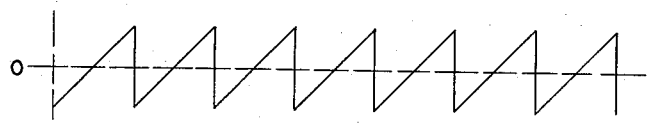
Fig. 3 is similar but illustrates the case of maximum duty cycle.

Moreover the maximum duty cycle can never exceed 50%. This is shown in Fig. 3.

Figure 4:
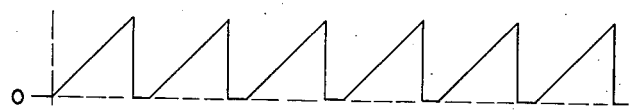
Fig. 4 shows the deflecting coil current obtained by using the present invention.

The ideal arrangement would be to have the sweep wave clamped at zero, with no recovery excursion below zero, in which case the wave form would be as shown in Fig. 4. Heretofore complex electron tube circuits have been used to clamp a voltage wave at zero, this being used to control driver tubes which provide current for the deflecting coils. In the present case the current wave is itself clamped at zero. This is done by using rectifiers so that the current can flow in one direction only, and that direction is so selected as to keep the sweep wave on a desired side of the zero line axis.

Figure 5:
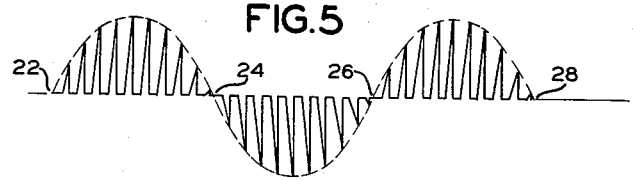
Fig. 5 shows the sinusoidal modulation of the sweep current, and explains the need for reversing switches.

For simplicity, the sweep waves shown in Figs. 1 thru 4 have been drawn unmodulated. In practice, however, the sweep current is sinusoidally modulated to provide sine and cosine currents for use in fixed deflecting coils disposed at right angles to one another. One of these currents is illustrated in Fig. 5, in which it will be seen that the sweep wave is positive from the point 22 to the point 24; negative from the point 24 to the point 26; positive from the point 26 to the point 28, and so on. The distance from the point 22 to the point 26 corresponds to one complete rotation or scan by the antenna. The sweep wave envelope for the deflecting coils on one axis is 90° out of phase from the sweep wave envelope for the deflecting coils on the other axis. The vector addition of the two waves produces the desired radial sweep customarily employed for a plan position indication on the screen of a cathode ray tube. In Fig. 5 it will be noted that the direction of the sweep wave is reversed each half revolution of the antenna, that is, at the points 24, 26, 28 etc.

Figure 6:
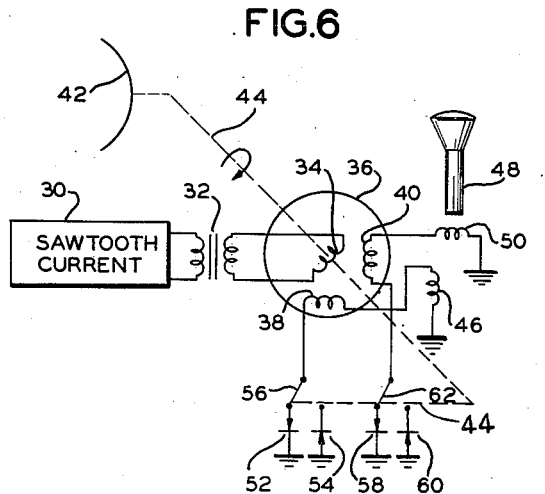
Fig. 6 is a schematic diagram of a simple apparatus embodying the invention.
Figure 7:
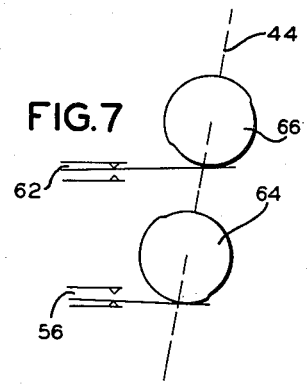
Fig. 7 illustrates a detail of the invention.

One form of apparatus to effectuate this is schematically illustrated in Figs. 6 and 7 of the drawing. Referring first to Fig. 6, the sweep current or sawtooth current is supplied from a suitable source 30, through a transformer 32 if desired, to the primary 34 of a rotary transformer 36 having two stator coils 38 and 40 disposed at right angles to each other. The rotor 34 is turned in unison with the antenna system 42, as by means of a synchronous system schematically represented by the dotted line 44. This provides two sinusoidally modulated sweep currents which are 90° out of phase. The stator coil 38 is connected to one of the stationary deflecting coils 46 of a cathode ray tube 48, while the other stator coil 40 is connected to the other stationary deflecting coil 50.

In accordance with the present invention, the coils 38 and 40 are grounded through rectifiers instead of being grounded directly. In the particular form of the invention here shown four rectifiers are employed, the rectifiers 52 and 54 being opposed in polarity and provided with a switch 56 so that either rectifier may be connected in circuit. The coil 40 is provided with oppositely poled rectifiers 58 and 60, and a reversing switch 62 for connecting one rectifier or the other in circuit. The switches 56 and 62 are operated automatically during the rotation of the rotary transformer.

The manner in which this is done will be clear from inspection of Fig. 7, in which it will be seen that cams 64 and 66 are provided, these being mounted for rotation in unison with the rotary transformer and the antenna. This is schematically indicated by the dotted line 44. Cam 64 operates switch 56, while cam 66 operates switch 62. Each cam is 180° cam which functions to close the switch downward during one half revolution, and upward during the other half revolution. The cams are disposed 90° apart, and of course are properly timed or aligned with their respective rotor coils. The change over point at which each switch changes from one position to the other corresponds to the points 24, 26 and 28 in Fig. 5.

The rectifiers are preferably selenium rectifiers, but copper oxide rectifiers may be employed, if desired. Metallic oxide rectifiers are preferred to tubes, because the series rectifiers must carry high peak current at a low potential drop. They are also simpler. However, tubes may be used under special limited conditions, as for example in the case of very fast sweeps, and preferably with a yoke coil designed for low current.

The load should be an inductive load, and this requirement is fulfilled when using fixed deflection coils, as shown.

It will also be understood that the sense of the rectification may be changed in other ways than that indicated. For example, a single rectifier may be used for each coil, and a double-pole double-throw switch may be employed to reverse the direction in which the rectifier is connected to the coil. In either form, the invention employs both rectification means, and reversing means. One advantage of the simple metallic rectifiers is that it is no great burden to employ dual rectifiers as shown in Fig. 6.

It will also be understood that in the case of special plan position indicator systems in which a full scan is not needed, it may be unnecessary to use reversing switches or dual rectifiers. For example, in a particular case in which the arc of rotation of the antenna system is limited to 90°, the reversing switches or/and dual rectifiers may be eliminated entirely, it being sufficient to employ a single rectifier directly in series with each coil.

It will therefore be apparent that while the invention has been described in preferred forms, changes and modifications may be made, without departing from the spirit of the invention, as sought to be defined in the following claims.

What is claimed is:

1. Apparatus comprising a cathode ray tube, fixed deflection coils for the same, a sweep wave generator, a rotary transformer for modulating the sweep wave before applying the same to the deflection coils, rectifiers for rectifying the modulated sweep wave in order to provide unidirectional current to said coils, a reversing switch for each of the deflection coils for reversing the direction of rectification, and cam means rotated in unison with the rotary transformer for operating said switches.

2. A fixed-coil plan-position-indicator system comprising a cathode ray tube having fixed deflection coils, a rotary antenna, a sweep wave generator, a rotary transformer turned in unison with the antenna system in order to provide sine and cosine modulations of the sweep current, rectifier means for one of said deflection coils, rectifier means for the other of said deflection coils, reversing switches connected between said rectifiers and said transformer to control the direction of rectification, and cams turned in synchronism with the antenna and rotary transformer for operating the aforesaid switches.

3. A fixed-coil plan-position-indicator system comprising a cathode ray tube having fixed deflection coils, a rotary antenna, a sawtooth wave generator, a rotary transformer turned in unison with the antenna system in order to provide sine and cosine modulations of the sawtooth sweep current, a pair of oppositely phased rectifiers for one of said deflection coils, another pair of oppositely phased rectifiers for the other of said deflection coils, single pole double throw switches connected between said rectifiers and said transformer to make one rectifier or the other of each pair operative, and cams turned in synchronism with the antenna and rotary transformer for operating the aforesaid switches.

4. A fixed-coil plan-position indicator sweep system comprising a cathode ray tube, fixed deflection coils for said tube, a sweep wave generator, a rotary transformer for modulating the output of said generator before applying said output to said coils, rectifiers for rectifying said modulated generator output to supply unidirectional current to said coils, and switches to reverse the direction of rectification at sweep current polarity reversals.

5. A fixed-coil plan-position indicator sweep system comprising a cathode ray tube, fixed deflection coils for said tube, a sweep wave generator, a rotary transformer for modulating the output of said generator before applying said output to said coils, rectifiers for rectifying said modulated generator output to supply unidirectional current to said coils, and switches to reverse the direction of rectification at sweep reversal points, said switches being operated in synchronism with the rotation of said rotary transformer.

WILLIAM O. REED.
LELAND J. HAWORTH.

REFERENCES CITED

The following references are of record in the file of this patent:

UNITED STATES PATENTS

| Number | Name | Date |
|---|---|---|
| 2,400,791 | Tolson | May 21, 1946 |
| 2,412,291 | Schade | Dec. 10, 1946 |